(12) United States Patent
Dickens et al.

(10) Patent No.: US 8,516,154 B2
(45) Date of Patent: *Aug. 20, 2013

(54) SERIAL ATTACHED SCSI AND SERIAL ATA WIDE PORT TUNNELLING THROUGH A FIBRE CHANNEL CONNECTION

(75) Inventors: Louie Arthur Dickens, Tucson, AZ (US); Timothy A. Johnson, Tucson, AZ (US); Craig Anthony Klein, Redington Beach, FL (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/195,642

(22) Filed: Aug. 1, 2011

(65) Prior Publication Data

US 2011/0289233 A1 Nov. 24, 2011

Related U.S. Application Data

(62) Division of application No. 12/054,855, filed on Mar. 25, 2008, now Pat. No. 8,019,895.

(51) Int. Cl.
*G06F 15/16* (2006.01)

(52) U.S. Cl.
USPC .......................................... 709/246; 370/466

(58) Field of Classification Search
USPC ......................................................... 370/466
See application file for complete search history.

(56) References Cited

U.S. PATENT DOCUMENTS 4,486,739 A * 12/1984 Franaszek et al. ............. 341/59
6,226,771 B1   5/2001 Hilla et al.
6,477,139 B1 * 11/2002 Anderson et al. ............. 370/216
6,516,352 B1 *  2/2003 Booth et al. .................. 709/250
6,625,241 B2 *  9/2003 Mejia ............................ 375/372
6,650,347 B1 * 11/2003 Nulu et al. .................... 715/853
6,801,960 B1 * 10/2004 Ericson et al. .................. 710/33

(Continued)

OTHER PUBLICATIONS

First Office Action dated Jul. 8, 2010, pp. 1-14, for U.S. Appl. No. 12/054,843 by inventors L.A. Dickens, et al.
Response dated Oct. 8, 2010, pp. 1-16, to First Office Action dated Jul. 8, 2010, pp. 1-14, for U.S. Appl. No. 12/054,843 by inventors L.A. Dickens, et al.
Notice of Allowance dated Jan. 20, 2011, pp. 1-15, for U.S. Appl. No. 12/054,843 by inventors L.A. Dickens, et al.

(Continued)

*Primary Examiner* — Bunjob Jaroenchonwanit
(74) *Attorney, Agent, or Firm* — Rabindranath Dutta; Konrad Raynes Davda & Victor LLP

(57) ABSTRACT

Network traffic encoded in a first protocol is transmitted across a first communications link, wherein the first protocol allows a first plurality of simultaneous logical connections. The transmitted network traffic is received at a first interface between the first communications link and a second communications link. The received network traffic is encapsulated within frames at the first interface, wherein the frames are generated in accordance with a second protocol, and wherein the second protocol does not allow any plurality of simultaneous logical connections that are allowed by the first protocol. The frames are transmitted from the first interface to a second interface across the second communications link. The frames are received and then unencapsulated network traffic is generated from the frames at the second interface, wherein the second interface is between the second communications link and a third communications link. The unencapsulated network traffic is routed to a selected logical connection of a second plurality of simultaneous logical connections across the third communications link, wherein transmission across the third communications link is in the first protocol.

4 Claims, 13 Drawing Sheets

(56) References Cited

U.S. PATENT DOCUMENTS

| | | |
|---|---|---|
| 6,842,126 B1* | 1/2005 | Tsai et al. ..................... 341/102 |
| 7,031,904 B1 | 4/2006 | Wilson et al. |
| 7,054,947 B2 | 5/2006 | Yun |
| 7,209,999 B2 | 4/2007 | Jamp et al. |
| 7,346,058 B1* | 3/2008 | Natarajan et al. ............. 370/392 |
| 7,443,845 B2 | 10/2008 | Gai et al. |
| 7,523,233 B1 | 4/2009 | Klein et al. |
| 7,619,984 B2* | 11/2009 | Carmichael .................. 370/252 |
| 7,949,789 B2 | 5/2011 | Dickens et al. |
| 8,019,895 B2 | 9/2011 | Dickens et al. |
| 2004/0028056 A1* | 2/2004 | Mitchem et al. ......... 370/395.21 |
| 2005/0125355 A1* | 6/2005 | Fein ................................. 705/57 |
| 2005/0172047 A1* | 8/2005 | Pettey .............................. 710/20 |
| 2006/0067266 A1* | 3/2006 | Ehlers et al. .................. 370/328 |
| 2006/0168371 A1* | 7/2006 | Chiu .............................. 710/62 |
| 2006/0230218 A1* | 10/2006 | Warren et al. ................. 710/315 |
| 2006/0242312 A1 | 10/2006 | Crespi et al. |
| 2007/0121621 A1 | 5/2007 | Moretti et al. |
| 2007/0223517 A1* | 9/2007 | Warren et al. ................. 370/463 |
| 2007/0226419 A1* | 9/2007 | Roy et al. ...................... 711/118 |
| 2007/0294572 A1* | 12/2007 | Kalwitz et al. .................... 714/9 |
| 2008/0126616 A1* | 5/2008 | Kumasawa et al. ............. 710/42 |
| 2008/0228897 A1* | 9/2008 | Ko ................................. 709/213 |
| 2008/0267192 A1* | 10/2008 | Blinick et al. ............. 370/395.7 |
| 2009/0003361 A1* | 1/2009 | Bakthavathsalam ........... 370/401 |
| 2009/0168654 A1* | 7/2009 | Mies et al. ..................... 370/241 |
| 2009/0187924 A1* | 7/2009 | Klein et al. .................... 719/326 |
| 2009/0248884 A1* | 10/2009 | Dickens et al. ............... 709/230 |
| 2009/0248889 A1 | 10/2009 | Dickens et al. |
| 2009/0271546 A1* | 10/2009 | Dickens et al. .................. 710/60 |
| 2010/0016023 A1* | 1/2010 | Yamauchi et al. .......... 455/562.1 |

OTHER PUBLICATIONS

"Serial Attached SCSI-1.1 (SAS 1.1)", American National Standard for Information Technology, ANSI INCITS 417-2006, Jun. 12, 2006.

"Fibre Channel—Framing and Signaling-2 (FC-FS-2)", American National Standard for Information Technology, ANSI INCITS 424-2007, Feb. 1, 2007.

First Office Action dated Aug. 11, 2010, pp. 1-13, for U.S. Appl. No. 12/054,855 by inventors L.A. Dickens, et al.

Restriction/Election Requirement dated Jun. 25, 2010, pp. 1-5, for U.S. Appl. No. 12/054,855 by inventors L.A. Dickens, et al.

Response dated Jul. 22, 2010, pp. 1-9, to Restriction/Election Requirement dated Jun. 25, 2010, pp. 1-5, for U.S. Appl. No. 12/054,855 by inventors L.A. Dickens, et al.

Response dated Nov. 12, 2010, pp. 1-13 to First Office Action dated Aug. 11, 2010, pp. 1-13, for U.S. Appl. No. 12/054,855 by inventors L.A. Dickens, et al.

Final Office Action dated Feb. 23, 2011, pp. 1-8, for U.S. Appl. No. 12/054,855 by inventors L.A. Dickens, et al.

Response dated Apr. 25, 2011, pp. 1-12, to Final Office Action dated Feb. 23, 2011, pp. 1-8, for U.S. Appl. No. 12/054,855 by inventors L.A. Dickens, et al.

Notice of Allowance dated May 9, 2011, pp. 1-5, for Final Office Action dated Feb. 23, 2011, pp. 1-8, for U.S. Appl. No. 12/054,855 by inventors L.A. Dickens, et al.

* cited by examiner

SERIAL ATTACHED SCSI AND SERIAL ATA WIDE PORT TUNNELLING THROUGH A FIBRE CHANNEL CONNECTION

CROSS-REFERENCE TO RELATED APPLICATIONS

This application is a divisional of U.S. patent application Ser. No. 12/054,855 filed on Mar. 25, 2008, which is incorporated herein by reference in its entirety.

BACKGROUND

1. Field

The disclosure relates to a method, system, and article of manufacture for serial attached SCSI and serial ATA wide port tunneling through a fibre channel connection.

2. Background

Serial Attached SCSI (SAS) is a variation of the Small Computer System Interface (SCSI), used for connecting storage devices to a computer system. SAS has been developed as an alternative to the fibre channel interface (FC), and offers similar performance to FC at a reduced cost, at the expense of connectivity and scalability.

SAS is based on an electric technology as opposed to an optical technology as in the case of fibre channel. As a result, SAS connectivity may have a distance limitation of about 10 meters, making SAS useful inside cabinets and for peripherals that are physically located next to the computer system that uses the interface. In contrast, fibre channel may allow communications over distances exceeding a kilometer. Therefore, SAS technology may be used to connect devices at relatively shorter distances in comparison to fibre channel. The cost of using SAS technology is relatively less in comparison to using fibre channel technology.

SUMMARY OF THE PREFERRED EMBODIMENTS

Provided are a method, system, and article of manufacture in which network traffic encoded in a first protocol is transmitted across a first communications link, wherein the first protocol allows a first plurality of simultaneous logical connections. The transmitted network traffic is received at a first interface between the first communications link and a second communications link. The received network traffic is encapsulated within frames at the first interface, wherein the frames are generated in accordance with a second protocol, and wherein the second protocol does not allow any plurality of simultaneous logical connections that are allowed by the first protocol. The frames are transmitted from the first interface to a second interface across the second communications link. The frames are received and then unencapsulated network traffic is generated from the frames at the second interface, wherein the second interface is between the second communications link and a third communications link. The unencapsulated network traffic is routed to a selected logical connection of a second plurality of simultaneous logical connections across the third communications link, wherein transmission across the third communications link is in the first protocol.

In further embodiments, the first protocol is a serial attached small computer system interface (SAS) protocol and the second protocol is the fibre channel protocol, wherein the first and the second plurality of logical connections are PHYs in accordance with the SAS protocol, wherein a parameter field of a fibre channel header is set to equal a numeric representation of a PHY, and wherein the unencapsulated network traffic is transmitted on the PHY corresponding to the parameter field in the fibre channel header.

In still further embodiments, the first protocol is a serial attached small computer system interface (SAS) protocol, wherein the second protocol is a fibre channel protocol, wherein when the first interface and the second interface perform port login to each other, the first and the second interfaces designate a fibre channel type field as a vendor unique type and designate a parameter field via a unique identifier to indicate that the first interface and the second interface are SAS extenders.

In yet further embodiments, the first protocol is a serial attached small computer system interface (SAS) protocol, wherein the second protocol is a fibre channel protocol, wherein the frames are fibre channel frames, wherein K characters are converted to D characters and then reconverted to the K characters during transmission of the network traffic, and wherein data communications is performed over a greater distance over the fibre channel protocol than over the SAS protocol.

In certain embodiments, the first communications link and the third communications link are both serial attached SCSI or SATA, and the second communications link is selected from a group comprising fibre channel, fibre channel over Ethernet, and Ethernet.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments allow SAS technology to be used without having to sacrifice the ability to have connectivity for storage over longer distances as in fibre channel by encapsulating the SAS traffic within fibre channel frames, wherein SAS extenders used in the embodiments include multiple PHYs as defined in the SAS protocol. A tunneling mechanism is created that allows a SAS connection to span several kilometers without creating an entire fibre channel SAN. The connection appears as an ordinary SAS connection to SAS devices, but has the extended distance support of a fibre channel connection.

In certain embodiments, when an encapsulated frame of a fibre channel protocol that encapsulates SAS traffic is received by a SAS extender on a fibre channel interface, an unencapsulated frame is transmitted on the PHY corresponding to the parameter field in the fibre channel header. A PHY is an object in a device that is used to interface to other devices. A SAS PHY is a PHY in a SAS device that interfaces to a service delivery subsystem, and a SAS logical PHY is a SAS PHY or a multiplexed portion of a SAS PHY. Finally, an expander PHY is a PHY in an expander device that interfaces to a service delivery subsystem. In this manner, each SAS PHY's traffic is routed to a single corresponding PHY on another SAS Extender. The fibre channel protocol does not allow multiple PHYs.

In certain embodiments, K characters within the SAS traffic that is transmitted via fibre channel frames are preserved as D characters, so that the original traffic can be recreated at the other end of the tunnel by the conversion of D characters to K characters, wherein K characters are special characters defined in both the SAS and fibre channel protocols, and wherein D characters are defined at least in the fibre channel protocol.

Encapsulating SAS Traffic within Fibre Channel Frames

Figure 1:
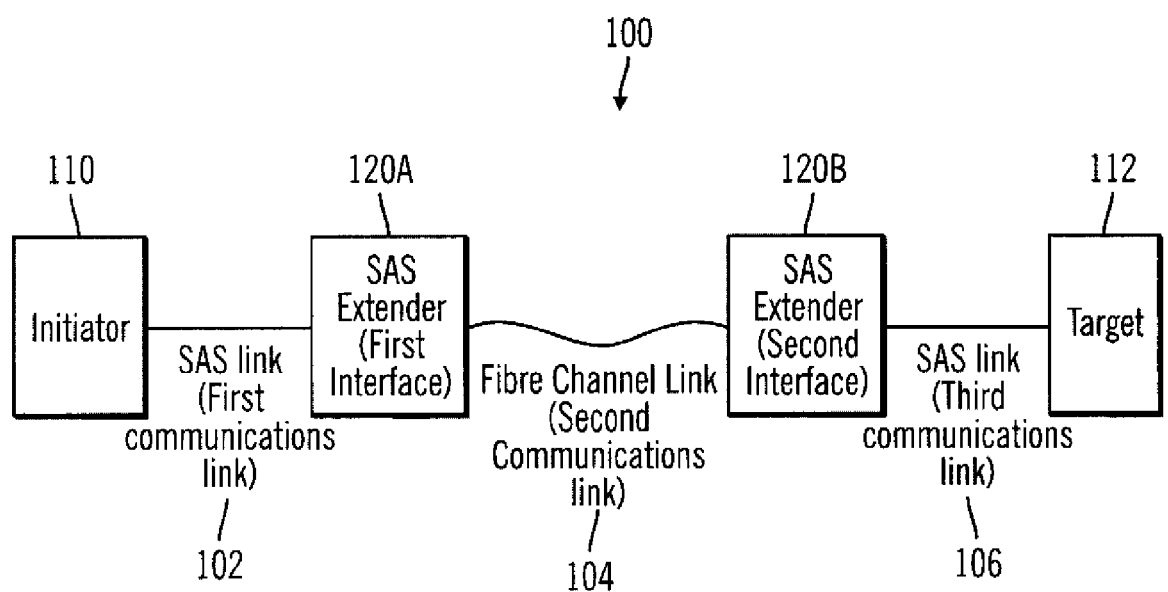
FIG. 1 illustrates a block diagram of a computing environment in which a first SAS storage system is shown, in accordance with certain embodiments.

FIG. 1 illustrates a computing environment in which a SAS storage system 100 is shown. Initiator 110 is connected via SAS link 102 to a SAS Extender 120A, wherein the SAS extender 120A is connected to SAS Extender 120B via a fibre channel link 104, and wherein the SAS extender 120B is in turn connected to target 112 via a SAS link 106. The fibre channel link 104 may physically be one or more kilometers long, allowing data from initiator 110 to be stored remotely on target 112. Initiator 110 and target 112 operate as if the fibre channel link 104 and the SAS extenders 120A and 120B are not in the connection, and the link is purely a SAS link.

In certain embodiments, the fibre channel link 104 may be hundreds of kilometers long, whereas the SAS link 102 and the SAS link 106 may be limited to 10 meters in length. In alternative embodiments, SAS link 102 and SAS link 106 may be implemented via serial attached advanced technology attachment (SATA). Fibre channel link 104 may be implemented via Ethernet or fibre-channel-over-Ethernet. The initiator 110, the target 112, and the SAS extenders 120A, 120B may comprise any suitable device including those presently known in the art, such as, a personal computer, a workstation, a server, a mainframe, a hand held computer, a palm top computer, a telephony device, a network appliance, a blade computer, a storage server, etc.

In certain embodiments the initiator 110 may transmit SAS frames or primitives over the SAS link 102. The SAS extender 120A converts K characters in the SAS frames or primitives to D characters for transmission across the fibre channel link 104 and the modified SAS frames or primitives are encapsulated within a fibre channel frame. The SAS extender 120B receives the fibre channel frame and converts D-characters back to K-characters to generate a SAS frame or primitive to transmit to the target 112 over the SAS link 106. As a result, the initiator 110 and target 112 which both use the SAS protocol for communications can communicate over long distances (such as over a kilometer) by using the SAS extenders 120A, 120B that are coupled via the fibre channel link 104. It should be noted that K characters may also be used in the fibre channel protocol, and by using D characters instead of the K characters of the SAS protocol, a SAS frame or primitive is encapsulated within a fibre channel frame.

Figure 2:
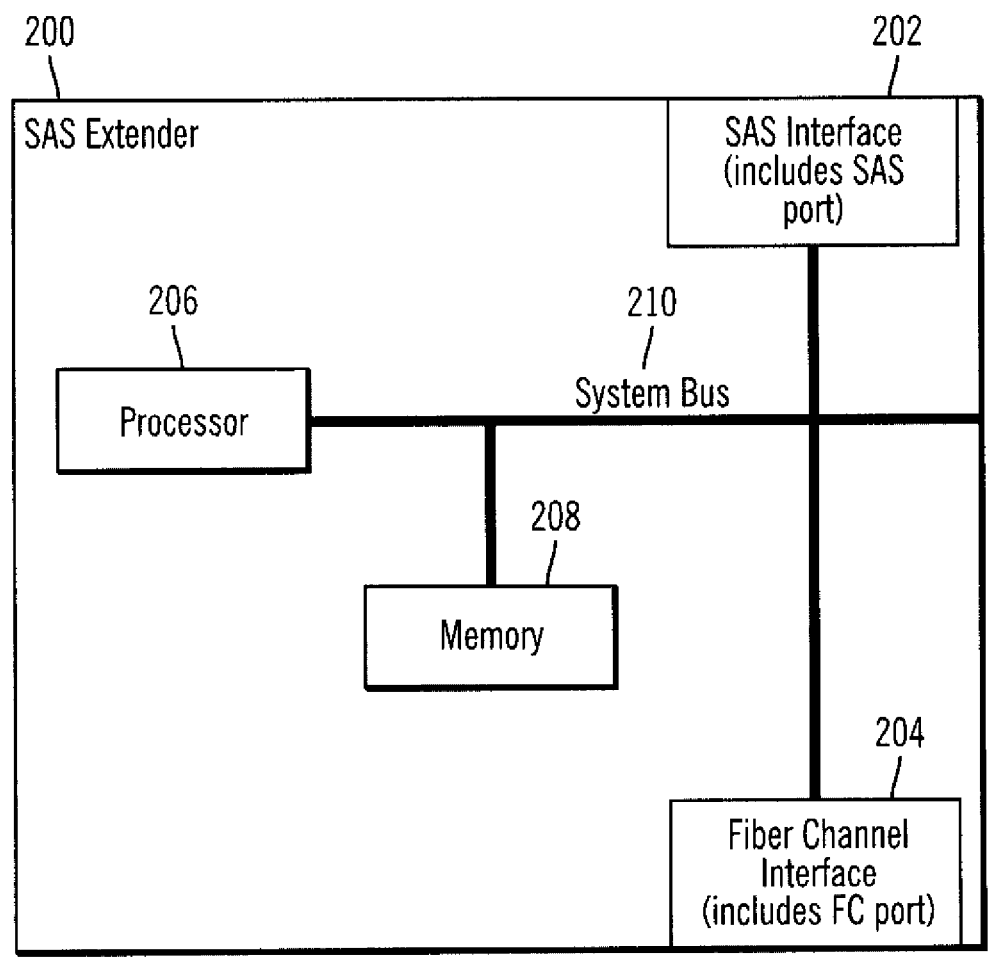
FIG. 2 shows a block diagram of a SAS extender in accordance with certain embodiments.

FIG. 2 shows a block diagram of an exemplary SAS extender 200 in accordance with certain embodiments. The exemplary SAS extender 200 is a schematic representation of the SAS extender 120A and the SAS extender 120B of FIG. 1. The SAS extender 200 is comprised of a processor 206, a memory 208, a fibre channel interface 204, and a SAS interface 202. The processor 206, the memory 208, the fibre channel interface 204 and the SAS interface 202 communicate via a system bus 210. The memory 208 may be comprised of a flash memory, a hard disk, an optical storage, a solid-state memory, or any other type of storage medium or a combination of memory types. The processor 206 controls the operation of the device via machine readable code stored within the memory 208. The SAS interface 202 and the fibre channel interface 204 may be comprised of one or more chipsets. The SAS interface 202 may include at least one SAS port and the fibre channel interface 204 may include at least a fibre channel port.

Figure 3:
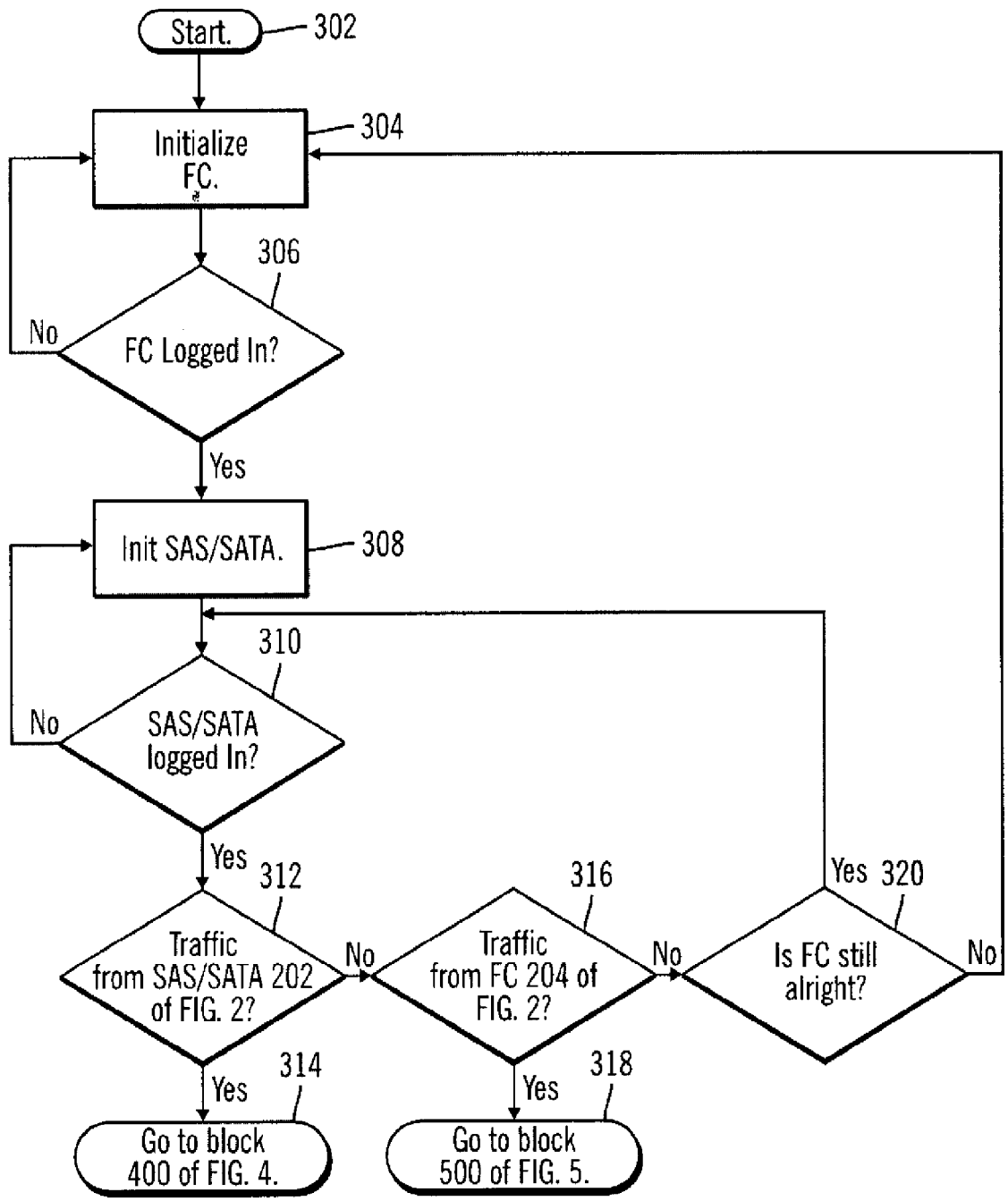
FIG. 3 illustrates operations performed by a SAS extender, in accordance with certain embodiments.

FIG. 3 illustrates operations performed by a SAS Extender processor, such as the processor 206 included in the SAS extender 200, wherein the SAS extender 200 is a representation of the SAS extenders 120A, 120B.

Control starts at 302, and proceeds to block 304, where a fibre channel link associated with the fiber channel interface 204 is initialized. The initialization of the fibre channel link includes speed negotiation, port login, process login, etc. In certain embodiments, a class 2 login is preferred, wherein a class 2 login is a type of login that is acknowledged. However, in alternate embodiments another class of service, such as class 3, may be used.

Control proceeds to block 306, where a determination is made as to whether the fibre channel login was successful and whether the fibre channel link 104 is operational. If not, control returns to block 304 and the initialization sequence is repeated. If at block 306 the fibre channel login is successful then control proceeds to block 308 where the SAS link connected to the SAS interface 202 is similarly initialized. The SAS link is checked (at block 310) to verify that the SAS initialization was successful and to verify that the SAS port 202 is logged in. If the initialization was not successful, control returns to block 308, where the SAS initialization process is repeated.

If at block 310 the SAS initialization was successful ("Yes" branch from block 310), then control proceeds to block 312, where a check is made for any incoming traffic from the SAS port 202. If there is traffic from the SAS port 202 ("Yes" branch from block 312), control proceeds to block 314, wherein at block 314 control proceeds to block 400 of FIG. 4 to be described later.

If at block 312, there is no traffic from SAS port 202 ("No" branch from block 312), control proceeds to block 316, where a check is made for traffic from the fibre channel port 204. If there is incoming traffic from the fibre channel port 204 ("Yes" branch from block 316), then control proceeds to block 318, wherein at block 318 control proceeds to block 500 of FIG. 5 to be described later.

If at block 316 there is no incoming traffic from fibre channel port 204 ("No" branch of block 316), control proceeds to block 320, where the fibre channel port 204 is checked for errors. If fibre channel port 204 is no longer logged in ("No" branch from block 320), control returns to block 304, where the fibre channel port 204 is initialized as before. If at block 320, fibre channel port 204 is still logged in ("Yes" branch from block 320), then control returns to block 310, where the SAS port 202 is checked as before.

Figure 4:
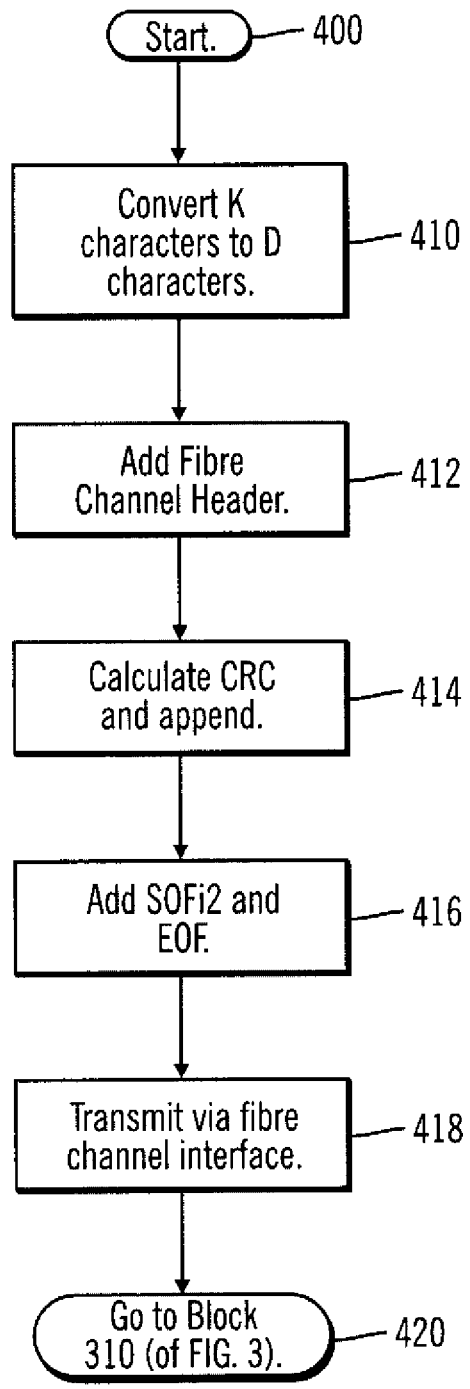
FIG. 4 illustrates operations that are performed when incoming traffic from a SAS port is detected, in accordance with certain embodiments.

FIG. 4 illustrates operations that are performed when incoming traffic from SAS port 202 is detected. The incoming traffic may be a primitive, a special sequence, or a SAS or SATA frame. Out of Band (OOB) data is not included, as OOB data may be handled by the SAS chipset and may not visible to the processor 206.

Control begins at block 400 and proceeds to block 410. At block 410, any K characters are converted to the corresponding D characters to preserve the identity of the K characters, wherein the phase-locked-loop in the fibre channel port 204 on the receiving end of fibre channel link 104 (of FIG. 1) is prevented from detecting the characters as a comma character. Control then proceeds to block 412, where a fibre channel header is added to the beginning of the SAS traffic fragment. The header may indicate in the R_CTL field that the information category for the frame is "Uncategorized Information". From block 412 control proceeds to block 414, where cyclic redundancy check (CRC) for the newly created fibre channel frame is calculated and appended to the end of the frame. At block 416, a start of frame is added to the front of the frame, preferably a SOFi2, and an end of frame (EOF) is appended to the end of the frame. At block 418, the frame is queued for transmission on the fibre channel interface port 204. If the fibre channel port 204 is logged in as a class 2 connection then block 418 verifies that the frame that is sent is also acknowledged by the receiving port. If the frame is not acknowledged, then the fibre channel interface may proceed into error recovery (not shown). Finally, control proceeds to block 420, where it returns to block 310 of FIG. 3. In alternative embodiments where Ethernet is used instead of fiber channel, K characters in SAS/SATA transmission are also converted to D characters.

Figure 5:
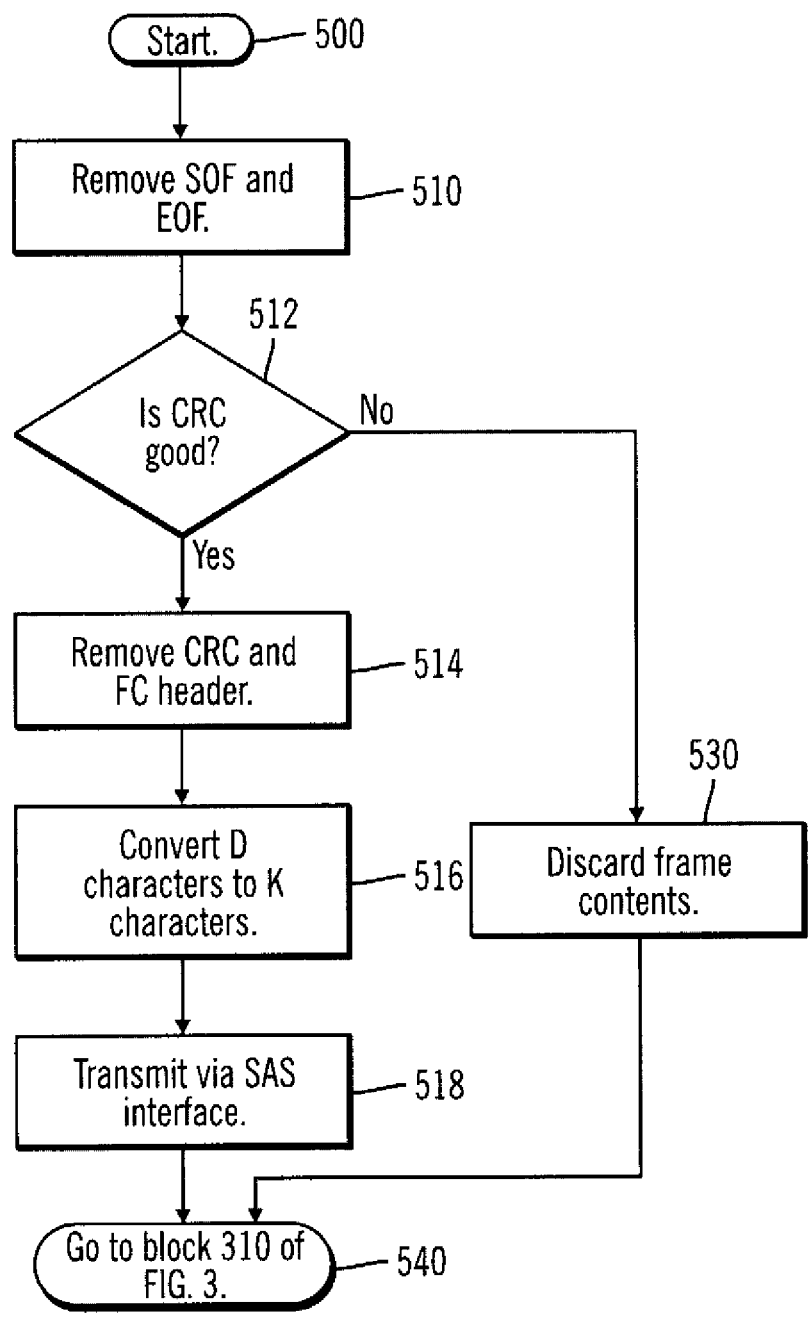
FIG. 5 illustrates operations that are performed when incoming traffic from a fibre channel port is detected, in accordance with certain embodiments.

FIG. 5 illustrates operations performed when incoming traffic from the fibre channel interface 204 is detected by the processor 206.

Control starts at block 500 and proceeds to block 510 where the start-of-frame and end-of-frame (SOF and EOF) are removed from the traffic unit, wherein the traffic unit may be a primitive, a special sequence, or a SAS/SATA frame. Control then proceeds to block 512, where the CRC for the frame contents is calculated and compared to the CRC at the end of the frame. If at block 512 the CRC does not compare successfully ("No" branch from block 512), then the frame is discarded in block 530, and control proceeds to block 540, where control returns to block 310 of FIG. 3.

If at block 512, the calculated CRC matches the CRC in the frame ("Yes" branch from block 512), control proceeds to block 514, where the CRC and the fibre channel header are removed from the traffic segment. In block 516, the first character in the remaining traffic segment is converted from a D character to its corresponding K character. Furthermore, if the traffic segment is longer than 4 characters, then the fourth from the last character is also converted from a data character to the corresponding K character. The traffic segment is then queued (at block 518) for transmission on the SAS interface port 202. Control then moves to block 540, where control returns to block 310 of FIG. 3.

Figure 6:
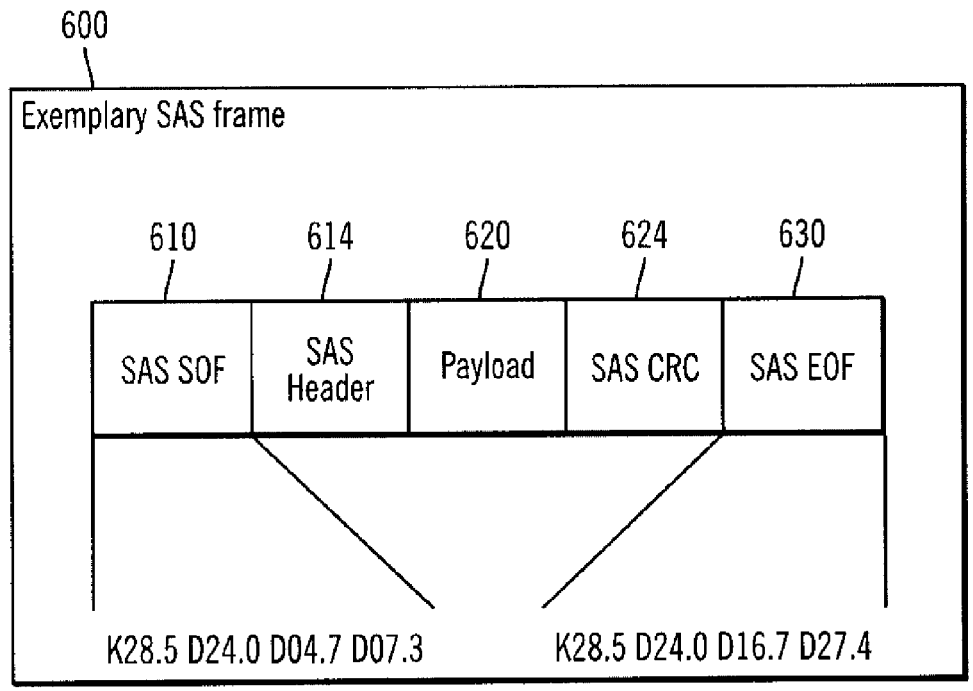
FIG. 6 illustrates a block diagram of an exemplary SAS frame that may be received by a SAS port, in accordance with certain embodiments.

FIG. 6 is a block diagram of an exemplary SAS frame 600 that may be received by the SAS port 202. The exemplary SAS frame 600 is comprised of a Start-of-Frame (SOF) 610, which is four characters long and is a "K28.5, D24.0, D04.7, D07.3". Following the Start-of-Frame 610 is the SAS Header 614, the SAS payload 620, and the SAS CRC 624. At the end of the SAS frame is an End-of-Frame (EOF) 630, comprising of K28.5, D24.0, D16.7, D27.4.

Figure 7:
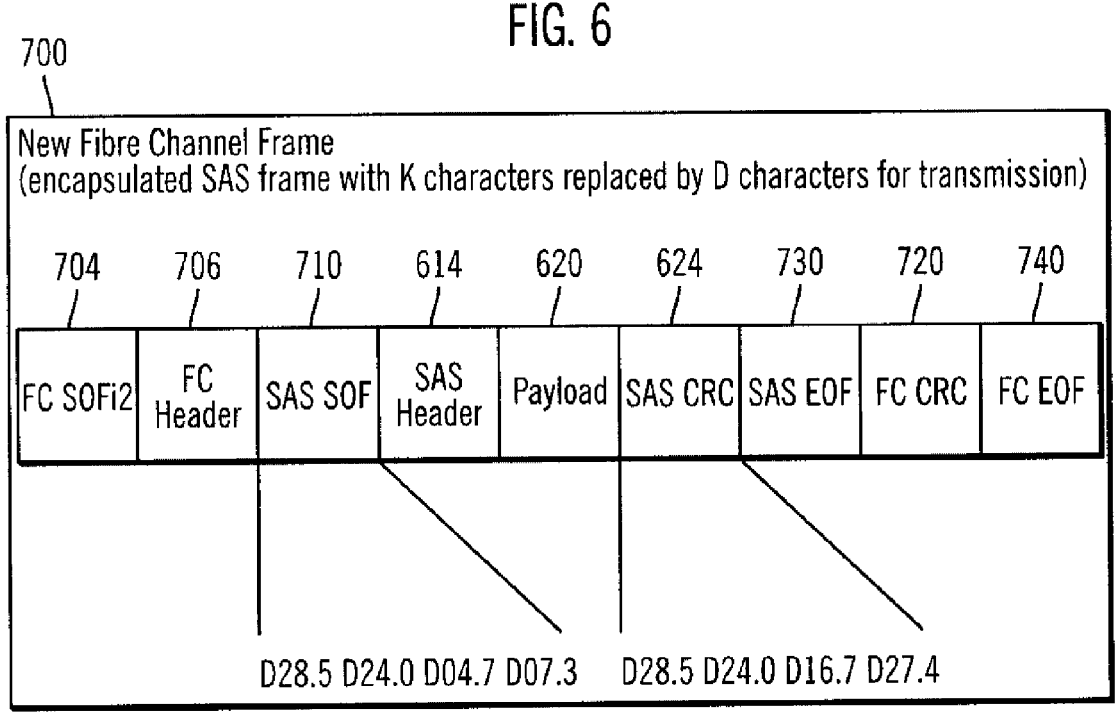
FIG. 7 illustrates a block diagram that shows a newly created fibre channel frame, wherein the newly created fibre channel frame is generated from an exemplary SAS frame, in accordance with certain embodiments.

FIG. 7 is a block diagram that shows a newly created fibre channel frame 700, wherein the newly created fibre channel frame 700 is generated from the exemplary SAS frame 600 after encapsulation. The new fibre channel frame 700 that is created begins with a fibre channel Start-of-Frame SOFi2 704 and is followed by the fibre channel header 706. Next in the fibre channel frame 700 is the encoded SAS Start-of-Frame SOF 710, which is the SAS Start-of-Frame SOF 610 (of FIG. 6) after converting the K character K28.5 to the corresponding D character D28.5. Following this are the SAS Header 614, the Payload 620 from the SAS frame 600, the SAS CRC 624, and the SAS End-of-Frame EOF 730 which is the encoded SAS EOF 630, after converting the K28.5 character to a D28.5 character. Next is the fibre channel CRC 720, calculated from the FC header 706 to the SAS EOF 730 and all bytes in between. At the end of the fibre channel frame 700 is the fibre channel End-of-Frame 740.

Figure 8:
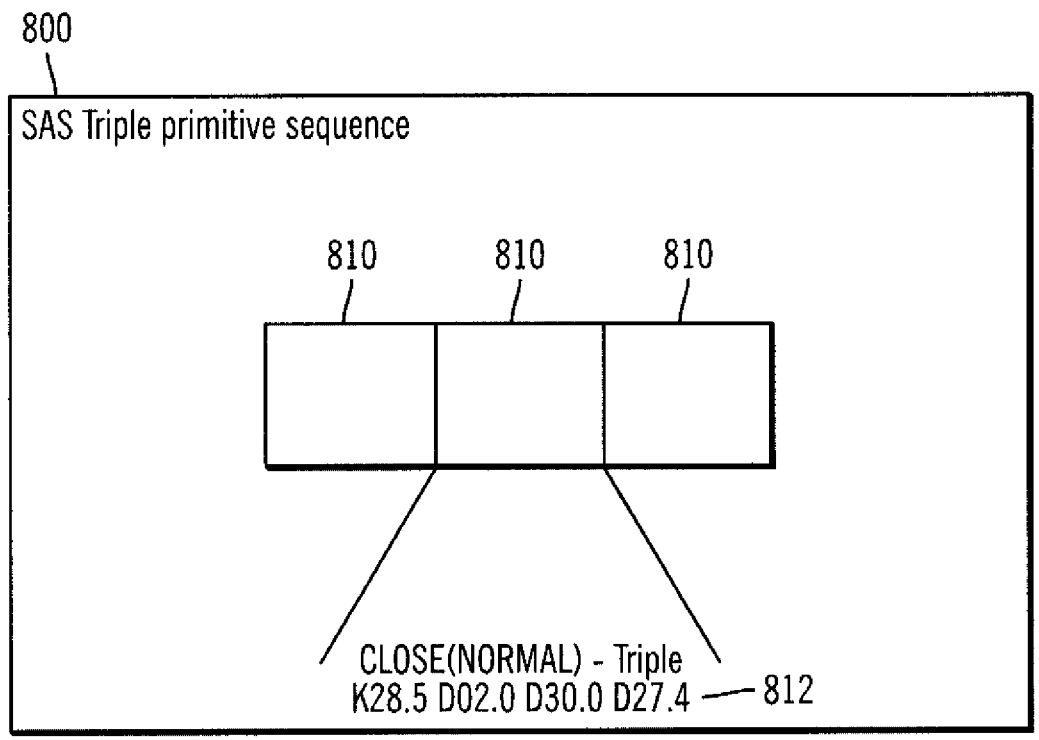
FIG. 8 illustrates a block diagram of an exemplary triple primitive sequence of SAS, in accordance with certain embodiments.

FIG. 8 shows a block diagram of an exemplary triple primitive sequence 800 of SAS, comprising of three consecutive Close (Normal) 810 which are K28.5, D02.0, D30.0, D27.4 (reference numeral 812). It requires three consecutive primitives 810 in order to be detected at the receiver. Another triple primitive sequence of the same type may not be detected without three consecutive non-deletable primitives in between.

Figure 9:
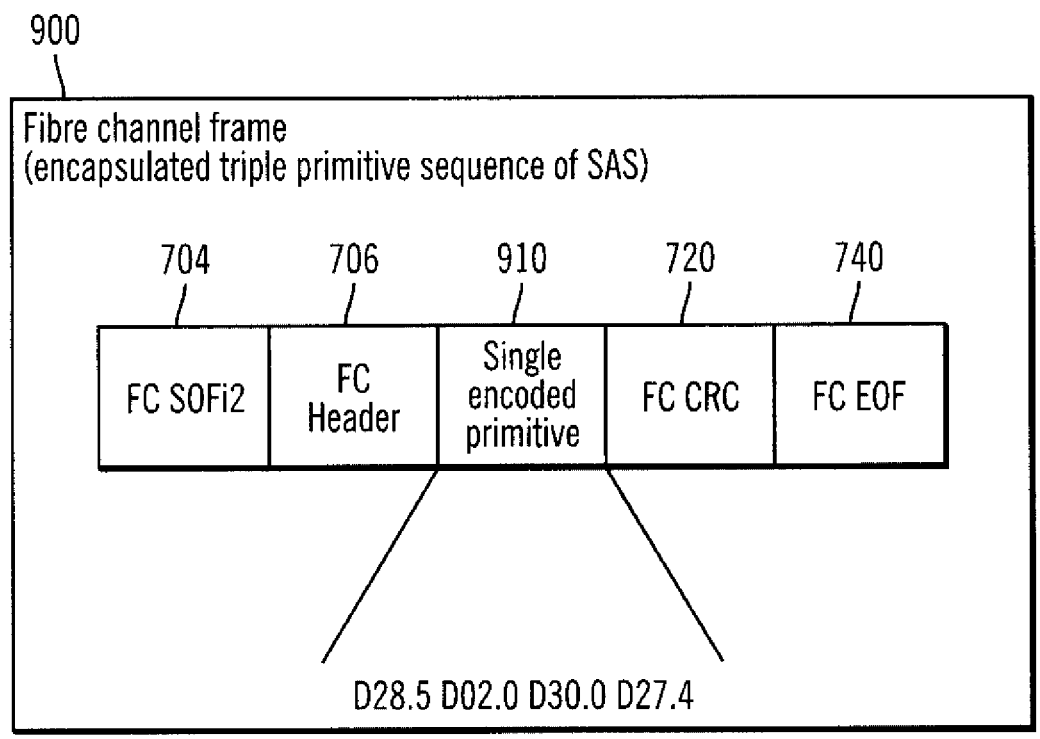
FIG. 9 illustrates a block diagram of a new fibre channel frame that includes an encapsulated version of a triple primitive sequence of SAS, in accordance with certain embodiments.

FIG. 9 shows a block diagram of a new fibre channel frame 900 that includes an encapsulated version of the triple primitive sequence 800 (of FIG. 8) of SAS, where a single occurrence of the encoded primitive 910 is encapsulated within the fibre channel frame 900. The triple primitive sequence 810, wherein each primitive comprises K28.5 D02.0 D30.0 D27.4 is replaced by a single encode primitive 910 comprising D28.5 D02.0 D30.0 D27.4 in the fibre channel frame 900. Thus the replacement of K characters in SAS triple primitive sequences by D characters in fibre channel frames is shown in FIG. 9. When the SAS trip primitive sequence 800 of FIG. 8 is received by the SAS port 202, the fibre channel frame 900 is transmitted on the fibre channel port 204 by processor 206. Additionally, when the fibre channel frame 900 in FIG. 9 is received by the fibre channel port 204, the triple primitive sequence 800 of FIG. 8 is transmitted on the SAS port 202 by processor 206.

Redundant primitive sequences are treated similarly, with the exception that the redundant primitive sequence is detected after three consecutive primitives by the SAS port 202, but when the fibre channel port 204 receives the encapsulated frame of FIG. 9 the fibre channel protocol 204 will generate six of the redundant primitives. Single primitives are encoded as they are received, on a one-to-one basis.

Figure 10:
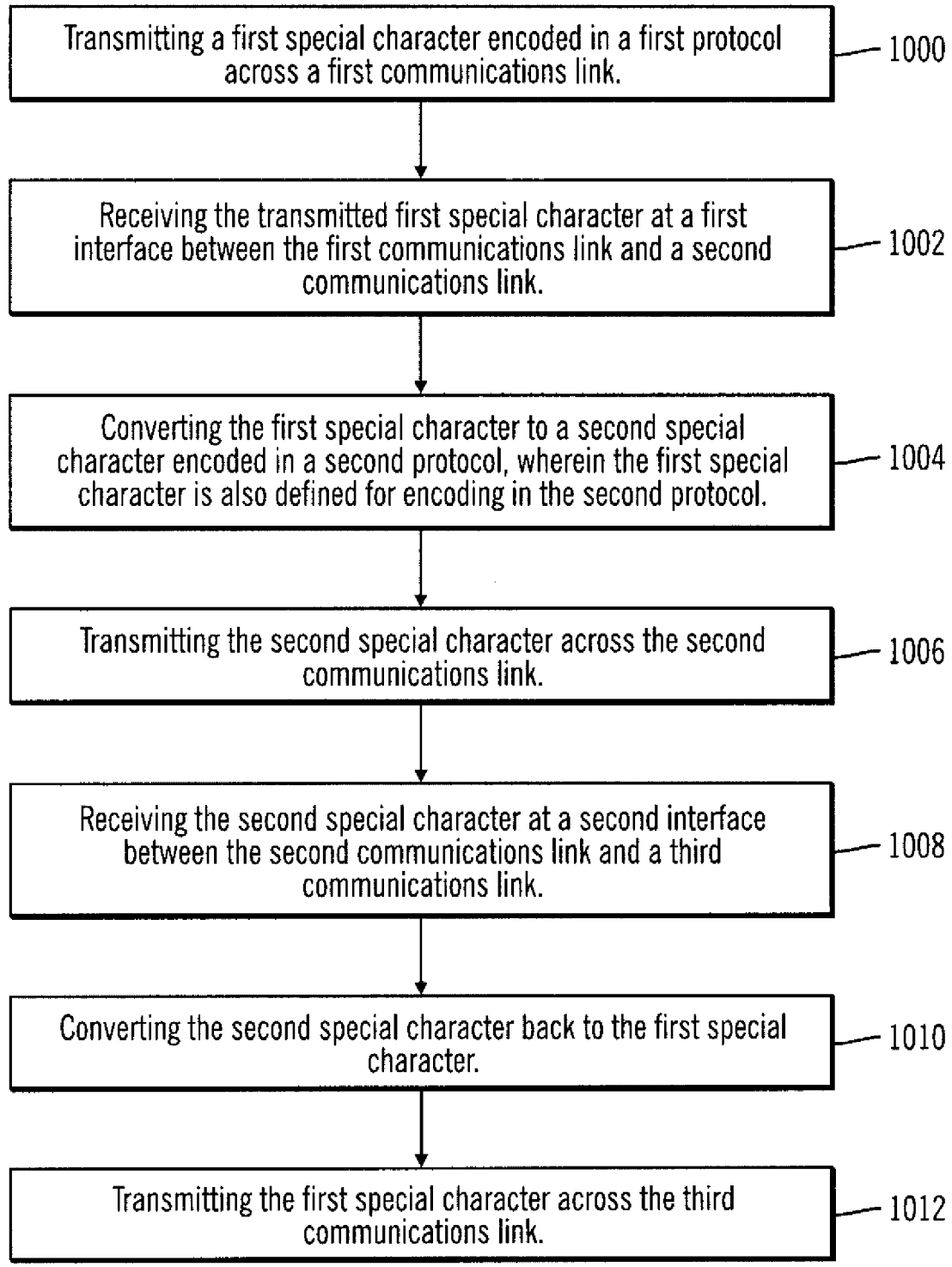
FIG. 10 illustrates operations that may be performed in accordance with certain embodiments in the computing environment of FIG. 1.

FIG. 10 illustrates operations that may be performed in accordance with certain embodiments.

Control starts at block 1000, where a first special character (e.g., a K character) encoded in a first protocol (e.g., SAS protocol) is transmitted across a first communications link 102 (e.g., a SAS link).

The transmitted first special character is received (at block 1002) at a first interface 120A (e.g., a SAS extender) between the first communications link 102 and a second communications link 104 (e.g., a fibre channel link).

The first special character is converted (at block 1004) to a second special character encoded in a second protocol, wherein the first special character is also defined for encoding in the second protocol (i.e., the K character is defined and permitted to be used in both the SAS and the fibre channel protocol). The conversion may take place in the first interface 120A.

Control proceeds to block 1006, where the first interface 120A may transmit the second special character across the second communications link 104. For example, the SAS extender 120A may transmit the D-character across the fibre channel link 104.

The second special character is received (at block 1008) at a second interface 120B (e.g., a SAS extender) between the second communications link 104 and a third communications link 106 (e.g., a SAS link). For example, in certain embodiments the SAS extender 120B receives D characters transmitted across the fibre channel link 104.

Control proceeds to block 1010, where the second interface 120B converts the second special character back to the first special character. The second interface 120B then transmits (at block 1012) the first special character across the third communications link.

Therefore, in certain embodiments an initiator 110 may transmit SAS frames or primitives over the SAS link 102. The SAS extender 120A converts K-characters in the SAS frames or primitives to D-characters for transmission across the fibre channel link 104 and the modified SAS frames or primitives are encapsulated within a fibre channel frame. The SAS extender 120B receives the fibre channel frame and converts D-characters back to K-characters to generate a SAS frame or primitive to transmit to the target 112 over the SAS link 106. As a result, the initiator 110 and target 112 which both use the SAS protocol for communications can communicate over long distances (such as over a kilometer) by using the SAS extenders 120A, 120B that are coupled via the fibre channel link 104.

Certain embodiments allow the transporting of SAS or SATA sequences over either fibre channel or Ethernet. In certain embodiments K-character types are preserved via a simple translation to D characters. In alternative embodiments a mapping scheme may be used to preserve the K character types. While embodiments have shown a simple mapping of K to D characters, other embodiments may utilize different mappings. Certain embodiments may use the unspecified routing and info category in the R_CTL (Routing Control) in the fibre channel Header (R_CTL=00). A frame forwarding methodology is used and primitives may be encapsulated within a fibre channel or an Ethernet frame.

In additional embodiments, conversion between K characters and D characters includes conversion of both frames and primitives, wherein an initiator and a target that communicate using the SAS protocol are able to communicate over distances that exceed a kilometer. In further embodiments, the K character and D character pairs are taken from the paired-groups of K28.3 and D28.3, K28.5 and D28.5, and K28.6 and D28.6 in the fibre channel and SAS protocols.

Wide Port Tunneling Through a Fibre Channel Connection

Figure 11:
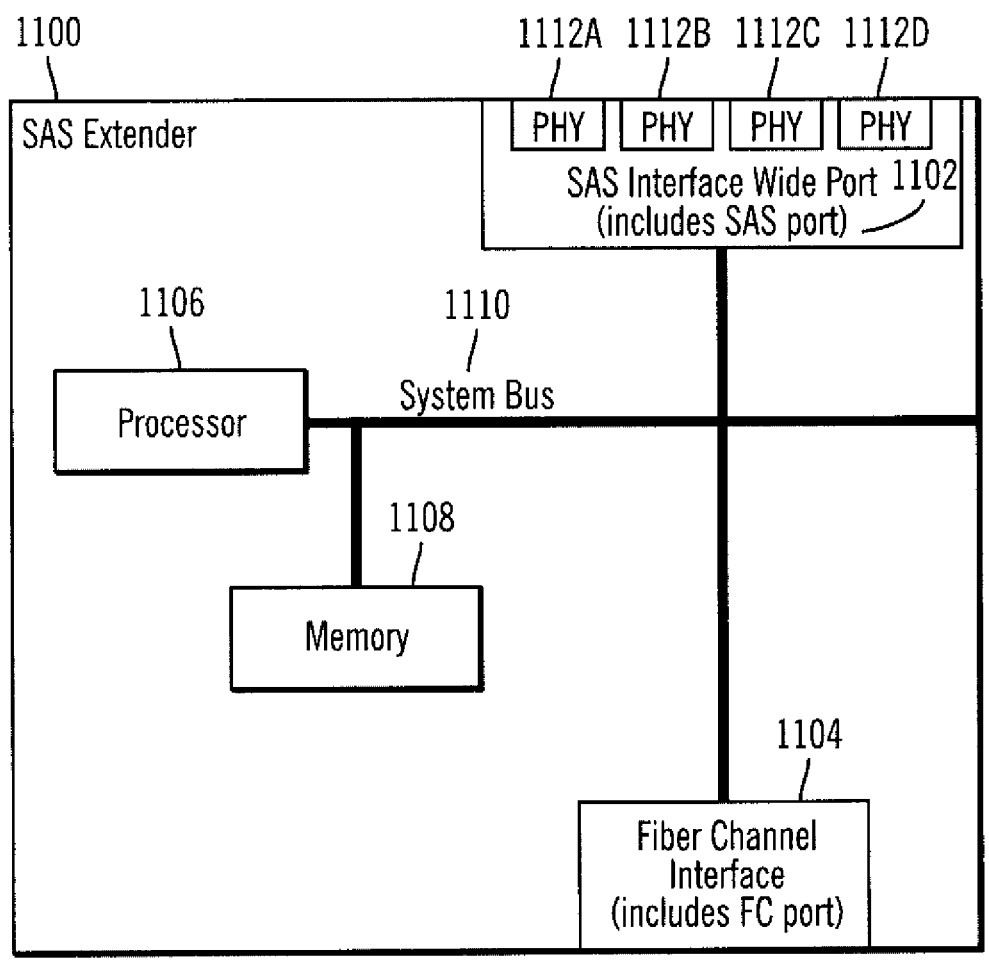
FIG. 11 illustrates a block diagram of an exemplary SAS extender with a plurality of PHYs, in accordance with certain embodiments.

FIG. 11 shows the hardware architecture of a SAS extender 1100, now with a wide SAS port 1102. The wide SAS port 1102 also referred to as a SAS interface wide port comprises of a processor 1106, a memory 1108, a fibre channel interface 1104, and a SAS interface 1102 with a wide port, having 4 PHYs 1112A, 1112B, 1112C, 1112D. A greater or a fewer number of PHYs may be used in alternative embodiments. In alternative embodiments SATA extenders and SATA interfaces may be used instead of SAS extenders and SAS interfaces.

The PHYs 1112A, 1112B, 1112C, 1112D are used to allow multiple connections at the same time, as each PHY provides a separate and distinct connection physical pathway for SAS traffic. The processor 1106, the memory 1108, the fibre channel interface 1104 and the SAS interface wide port 1102 communicate via a system bus 1110. The memory 1108 may be either flash, a hard disk, optical storage, solid-state memory, or any other type of medium or a mixture of types. Processor 1106 may control the operation of the SAS extender 1100 via machine readable code stored within the memory 1108. SAS interface 1102 and fibre channel interface 1104 may be comprised of chipsets.

Figure 12:
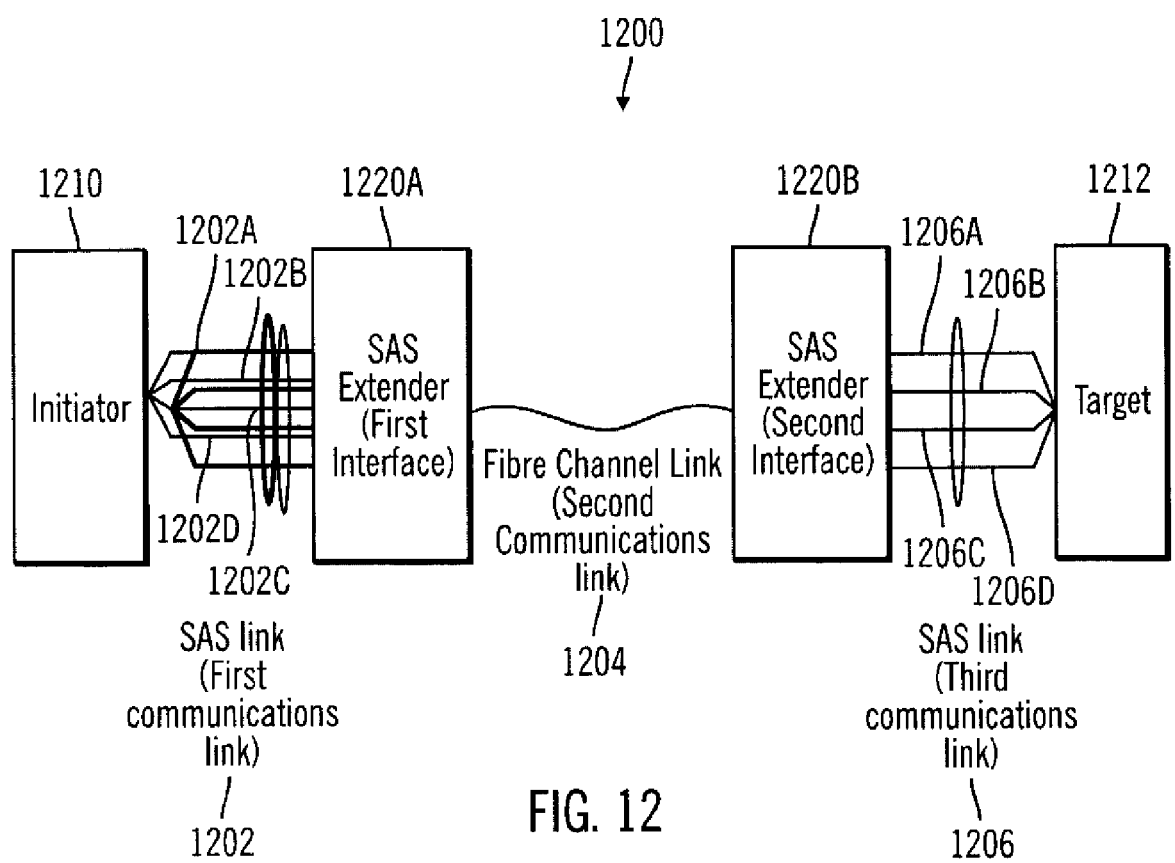
FIG. 12 illustrates a block diagram of a computing environment in which a second SAS storage system is shown, in accordance with certain embodiments.

FIG. 12 shows a computing environment 1200 in which a SAS host 1210 referred to as an initiator is connected to a SAS Extender 1220A via a SAS interface 1202 referred to as a SAS link, wherein the SAS extender 1220A is in turn connected to SAS Extender 1220B via a fibre channel link 1204, and wherein the SAS Extender 1220B is connected to SAS target 1212 via SAS link 1206.

SAS Extender 1220A encapsulates SAS traffic that comes from the SAS Initiator 1210 via the SAS link 1202 within a fibre channel frame and then transmits the fibre channel frame to the SAS Extender 1220B via the fibre channel link 1204. The SAS Extender 1220B removes the fibre channel encapsulation from the encapsulated SAS frame, and forwards the frame to the SAS target 1212 via the SAS link 1206.

Additionally, the SAS Extender 1220B encapsulates SAS traffic that comes from SAS target 1212 via the SAS link 1206 within a fibre channel frame and transmits the fibre channel frame to SAS Extender 1220A via the fibre channel link 1204. SAS Extender 1220A removes the fibre channel encapsulation from the encapsulated SAS/SATA frame, and forwards the frame to the SAS initiator 1210 via the SAS link 1202.

In FIG. 12, the SAS (or alternatively SATA) interface 1202 comprises of four PHYs 1202A, 1202B, 1202C, and 1202D, allowing four simultaneous SAS connections. The encapsulated traffic from the four PHYs are multiplexed by the SAS Extender 1220A on the fibre channel link 1204.

Figure 13:
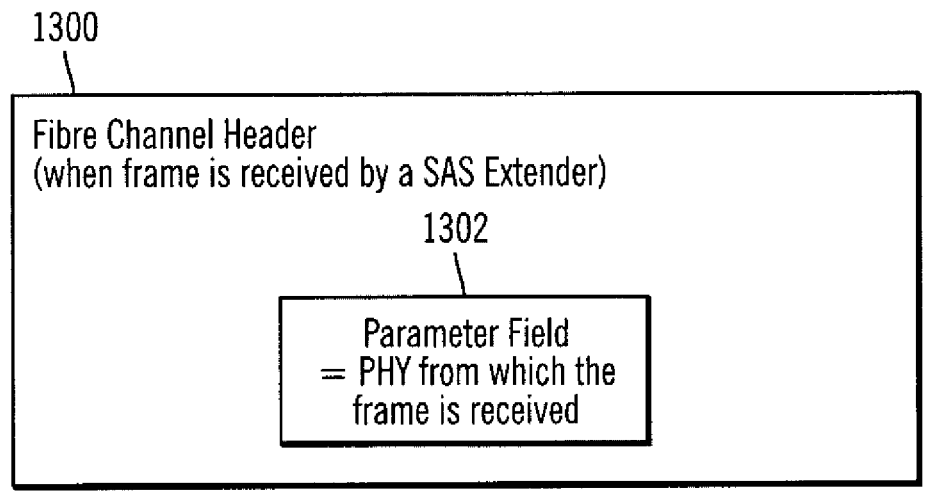
FIG. 13 illustrates a block diagram for a first exemplary fibre channel header, in accordance with certain embodiments.

When the traffic is received by the SAS Extender 1220B, the SAS Extender routes the unencapsulated SAS traffic back onto the same PHY that the target 1212 was originally discovered on. This is accomplished via the parameter field 1302 (shown in FIG. 13) in the fibre channel header 1300 (shown in FIG. 13), which is previously undefined for a vendor unique frame. When a frame is received by a SAS Extender 1220A or 1220B from the SAS interface wide port 1102 (shown in FIG. 11), the parameter field 1302 (shown in FIG. 13) of the fibre channel header 1300 (shown in FIG. 13) is set equal to the PHY from which the frame was received. For example, for PHY 0, the parameter field is set to 0, for PHY 1, the parameter field is set to 1, and so on. When an encapsulated frame is received by the SAS Extender 1220A or the SAS Extender 1220B on the fibre channel interface 1204, the unencapsulated frame is transmitted on the PHY corresponding to the parameter field in the fibre channel header. In this manner, each SAS PHY's traffic is always routed to a single corresponding PHY on the other SAS Extender.

Figure 14:
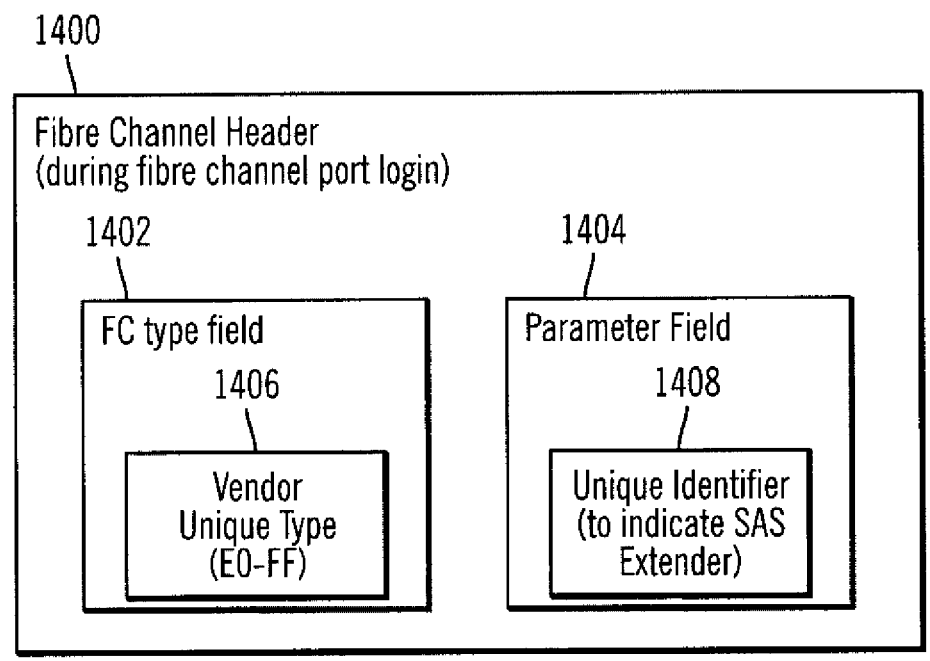
FIG. 14 illustrates a block diagram for a second exemplary fibre channel header, in accordance with certain embodiments.

When SAS Extenders 1220A and 1220B perform fibre channel port logins to each other, the SAS Extenders 1220A and 1220B designate in the fibre channel type field 1402 (shown in FIG. 14) that they are a vendor unique type 1406 (shown in FIG. 14, wherein a fibre channel header 1400 during fibre channel port login is shown in FIG. 14) with values ranging from E0 too FF, and in the parameter field 1404 (shown in FIG. 14) designate that they are a SAS Extender via a unique identifier 1408 (shown in FIG. 14).

Figure 15:
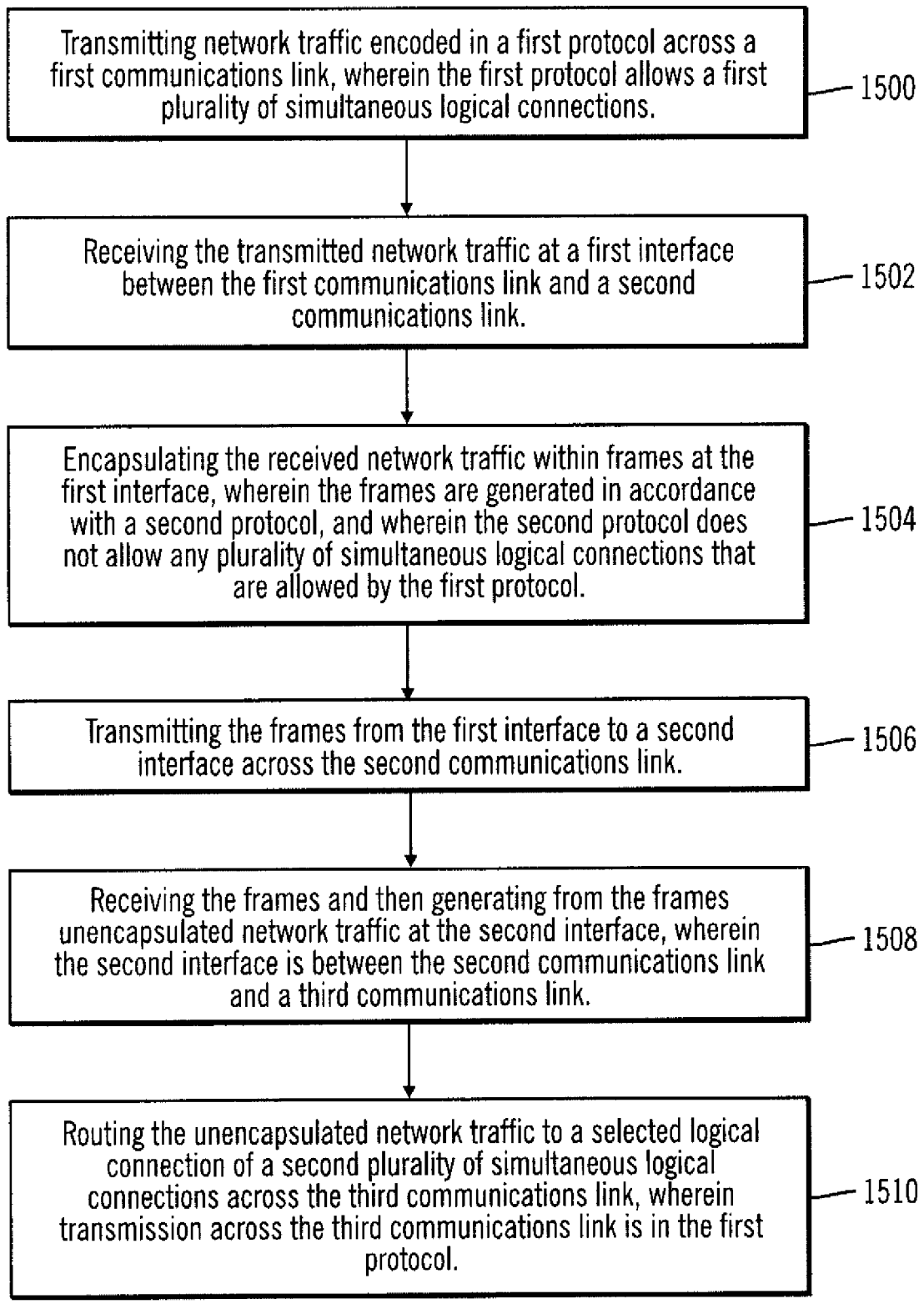
FIG. 15 illustrates operations that may be performed in accordance with certain embodiments in the computing environment of FIG. 12.

FIG. 15 illustrates operations that may be performed in accordance with certain embodiments in the computing environment 1200 of FIG. 12.

Control starts at block 1500 where the network traffic encoded in a first protocol, (such as the SAS protocol) is transmitted across a first communications link 1202 (such as a SAS link), wherein the first protocol allows a first plurality of simultaneous logical connections 1202A, 1202B, 1202C, 1202D (e.g., PHYs). The transmitted network traffic is received (at block 1502) at a first interface 1220A (e.g., SAS Extender 1220A) between the first communications link 1202 and a second communications link 1204.

The received network traffic is encapsulated (at block 1504) within frames at the first interface 1220A, wherein the frames are generated in accordance with a second protocol (such as the fibre channel protocol), and wherein the second protocol does not allow any plurality of simultaneous logical connections that are allowed by the first protocol.

The frames are transmitted (at block 1506) from the first interface 1220A to a second interface 1220B (e.g., SAS Extender 1220B) across the second communications link 1204. The frames are received (at block 1508) and then unencapsulated network traffic is generated from the frames at the second interface 1220B, wherein the second interface 1220B is between the second communications link 1204 and a third communications link 1206. The unencapsulated network traffic is routed (at block 1510) to a selected logical connection (e.g., a PHY) of a second plurality of simultaneous logical connections 1206A, 1206B, 1206C, 1206D across the third communications link 1206, wherein transmission across the third communications link is in the first protocol.

In certain embodiments, the first protocol is a SAS protocol, wherein the second protocol is a fibre channel protocol, wherein the frames are fibre channel frames, wherein K characters are converted to D characters and then reconverted to the K characters during transmission of the network traffic (as described in the section entitled "Encapsulating SAS traffic within fibre channel frames"), and wherein data communications is performed over a greater distance over the fibre channel protocol than over the SAS protocol.

In certain embodiments, the first communications link 1202 and the third communications link 1206 are both serial attached SCSI or SATA, and the second communications link 1204 is selected from a group comprising fibre channel and Ethernet.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 16:
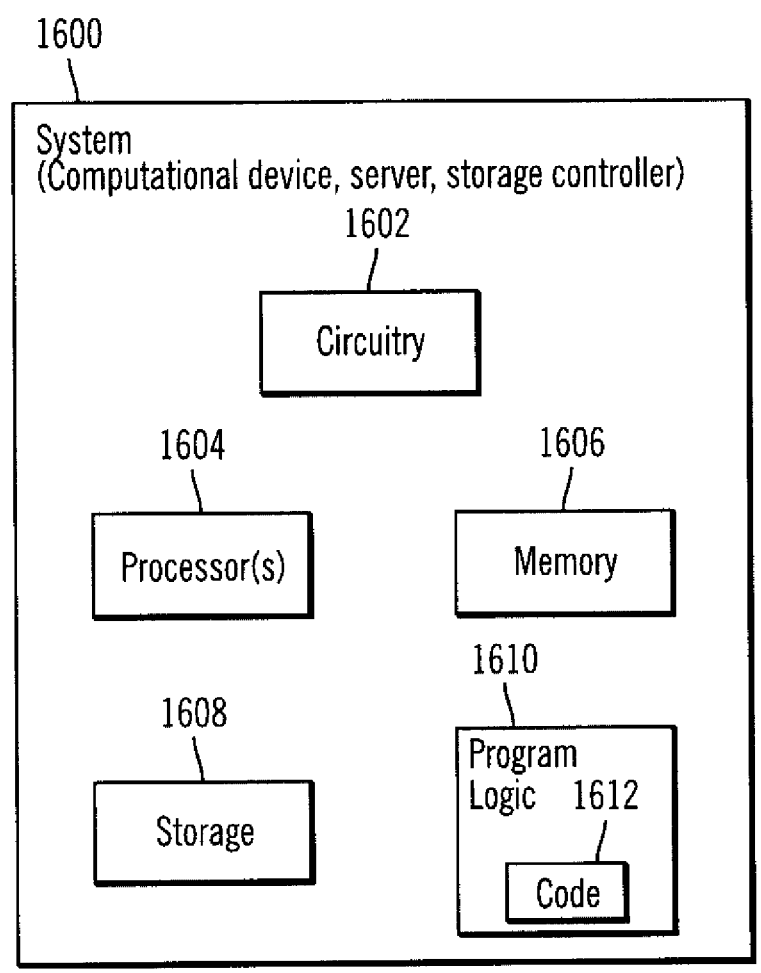
FIG. 16 illustrates a block diagram that shows certain elements that may be included in the initiators, targets, and SAS extenders in the computing environment of FIGS. 1 and 12, in accordance with certain embodiments.

FIG. 16 illustrates a block diagram that shows certain elements that may be included in the initiators 110, 1210, targets 112, 1212 and SAS extenders 120A, 120B, 1220A, 1220B in accordance with certain embodiments. One or more of the initiators 110, 1210, targets 112, 1212 and SAS extenders 120A, 120B, 1220A, 1220B, either individually or collectively may also be referred to as a system 1600, and may include a circuitry 1602 that may in certain embodiments include a processor 1604. The system 1600 may also include a memory 1606 (e.g., a volatile memory device), and storage 1608. The storage 1608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1608 may comprise an internal storage device, an attached storage device and/or a network accessible storage device. The system 1600 may include a program logic 1610 including code 1612 that may be loaded into the memory 1606 and executed by the processor 1604 or circuitry 1602. In certain embodiments, the program logic 1610 including code 1612 may be stored in the storage 1608. In certain other embodiments, the program logic 1610 may be implemented in the circuitry 1602. Therefore, while FIG. 16 shows the program logic 1610 separately from the other elements, the program logic 1610 may be implemented in the memory 1606 and/or the circuitry 1602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-16 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-16 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:

transmitting network traffic encoded in a first protocol across a first communications link, wherein the first protocol allows a first plurality of simultaneous logical connections;

receiving the transmitted network traffic at a first interface between the first communications link and a second communications link;

encapsulating the received network traffic within frames at the first interface, wherein the frames are generated in accordance with a second protocol, and wherein the second protocol does not allow any plurality of simultaneous logical connections that are allowed by the first protocol;

transmitting the frames from the first interface to a second interface across the second communications link;

receiving the frames and then generating from the frames unencapsulated network traffic at the second interface, wherein the second interface is between the second communications link and a third communications link; and routing the unencapsulated network traffic to a selected logical connection of a second plurality of simultaneous logical connections across the third communications link, wherein transmission across the third communications link is in the first protocol, wherein the first protocol is a serial attached small computer system interface (SAS) protocol, wherein the second protocol is a fibre channel protocol, wherein the frames are fibre channel frames, wherein K characters are converted to D characters and then reconverted to the K characters during transmission of the network traffic, and wherein data communications is performed over a greater distance over the fibre channel protocol than over the SAS protocol.

2. A system, comprising:
a memory; and
a processor coupled to the memory, wherein the processor performs operations, the operations comprising:
(i) transmitting network traffic encoded in a first protocol across a first communications link, wherein the first protocol allows a first plurality of simultaneous logical connections;
(ii) receiving the transmitted network traffic at a first interface between the first communications link and a second communications link;
(iii) encapsulating the received network traffic within frames at the first interface, wherein the frames are generated in accordance with a second protocol, and wherein the second protocol does not allow any plurality of simultaneous logical connections that are allowed by the first protocol;
(iv) transmitting the frames from the first interface to a second interface across the second communications link;
(v) receiving the frames and then generating from the frames unencapsulated network traffic at the second interface, wherein the second interface is between the second communications link and a third communications link; and
(vi) routing the unencapsulated network traffic to a selected logical connection of a second plurality of simultaneous logical connections across the third communications link, wherein transmission across the third communications link is in the first protocol, wherein the first protocol is a serial attached small computer system interface (SAS) protocol, wherein the second protocol is a fibre channel protocol, wherein the frames are fibre channel frames, wherein K characters are converted to D characters and then reconverted to the K characters during transmission of the network traffic, and wherein data communications is performed over a greater distance over the fibre channel protocol than over the SAS protocol.

3. A computer readable storage medium selected from a group consisting of a magnetic storage, an optical storage, a volatile storage, a non-volatile storage, and a memory, wherein code stored in the computer readable storage medium when executed by a processor performs operations, the operations comprising:
transmitting network traffic encoded in a first protocol across a first communications link, wherein the first protocol allows a first plurality of simultaneous logical connections;
receiving the transmitted network traffic at a first interface between the first communications link and a second communications link;
encapsulating the received network traffic within frames at the first interface, wherein the frames are generated in accordance with a second protocol, and wherein the second protocol does not allow any plurality of simultaneous logical connections that are allowed by the first protocol;
transmitting the frames from the first interface to a second interface across the second communications link;
receiving the frames and then generating from the frames unencapsulated network traffic at the second interface, wherein the second interface is between the second communications link and a third communications link; and
routing the unencapsulated network traffic to a selected logical connection of a second plurality of simultaneous logical connections across the third communications link, wherein transmission across the third communications link is in the first protocol, wherein the first protocol is a serial attached small computer system interface (SAS) protocol, wherein the second protocol is a fibre channel protocol, wherein the frames are fibre channel frames, wherein K characters are converted to D characters and then reconverted to the K characters during transmission of the network traffic, and wherein data communications is performed over a greater distance over the fibre channel protocol than over the SAS protocol.

4. A method for deploying computing infrastructure, comprising integrating machine-readable code into a machine, wherein the code in combination with the machine is capable of performing:
transmitting network traffic encoded in a first protocol across a first communications link, wherein the first protocol allows a first plurality of simultaneous logical connections;
receiving the transmitted network traffic at a first interface between the first communications link and a second communications link;
encapsulating the received network traffic within frames at the first interface, wherein the frames are generated in accordance with a second protocol, and wherein the second protocol does not allow any plurality of simultaneous logical connections that are allowed by the first protocol;
transmitting the frames from the first interface to a second interface across the second communications link;
receiving the frames and then generating from the frames unencapsulated network traffic at the second interface, wherein the second interface is between the second communications link and a third communications link; and
routing the unencapsulated network traffic to a selected logical connection of a second plurality of simultaneous logical connections across the third communications link, wherein transmission across the third communications link is in the first protocol, wherein the first protocol is a serial attached small computer system interface (SAS) protocol, wherein the second protocol is a fibre channel protocol, wherein the frames are fibre channel frames, wherein K characters are converted to D characters and then reconverted to the K characters during transmission of the network traffic, and wherein data communications is performed over a greater distance over the fibre channel protocol than over the SAS protocol.

* * * * *